United States Patent
Tissot et al.

(10) Patent No.: US 10,749,222 B2
(45) Date of Patent: Aug. 18, 2020

(54) THERMAL BATTERY WITH SHUT-OFF VALVE

(71) Applicant: Valeo Systemes Thermiques, Le Mesnil Saint Denis (FR)

(72) Inventors: Julien Tissot, Le Mesnil Saint Denis (FR); Kamel Azzouz, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 262 days.

(21) Appl. No.: 15/547,907

(22) PCT Filed: Feb. 2, 2016

(86) PCT No.: PCT/EP2016/052193
§ 371 (c)(1),
(2) Date: Aug. 1, 2017

(87) PCT Pub. No.: WO2016/124603
PCT Pub. Date: Aug. 11, 2016

(65) Prior Publication Data
US 2018/0248236 A1 Aug. 30, 2018

(30) Foreign Application Priority Data
Feb. 2, 2015 (FR) ...................................... 15 50772

(51) Int. Cl.
*H01M 10/613* (2014.01)
*F28D 20/02* (2006.01)
(Continued)

(52) U.S. Cl.
CPC .......... *H01M 10/613* (2015.04); *F16K 31/22* (2013.01); *F16K 33/00* (2013.01); *F28D 20/00* (2013.01);
(Continued)

(58) Field of Classification Search
CPC ................................. F16K 31/22; F16K 33/00
See application file for complete search history.

(56) References Cited

U.S. PATENT DOCUMENTS 5,435,277 A 7/1995 Takahashi
6,209,573 B1 * 4/2001 Chau ....................... B60S 1/481
137/314

FOREIGN PATENT DOCUMENTS

EP 0 806 556 A1 11/1997
FR 2 713 279 A1 6/1995

OTHER PUBLICATIONS

International Search Report issued in PCT/EP2016/052193 dated May 3, 2016 (2 pages).

(Continued)

*Primary Examiner* — Ladan Mohaddes
(74) *Attorney, Agent, or Firm* — Osha Liang LLP

(57) ABSTRACT

A thermal battery including a storage vessel as well as an inlet pipe and an outlet pipe for a fluid that are connected to a circulation circuit is disclosed. The thermal battery also has at least two shut-off valves placed on the inlet pipe and the fluid outlet pipe, respectively, to isolate the fluid contained in the storage vessel when the circulation circuit of the fluid is shut off. The shut-off valves are automatic and include an enclosure containing the fluid and including an inlet and an outlet for the fluid, and a float that is moveable between: an upper position in which the float floats and obstructs at least the outlet when the circulation circuit is shut off, and a lower position in which the float is submerged and allows the fluid to flow between the inlet and the outlet when the circulation circuit is operational.

13 Claims, 4 Drawing Sheets

Figure 1A:
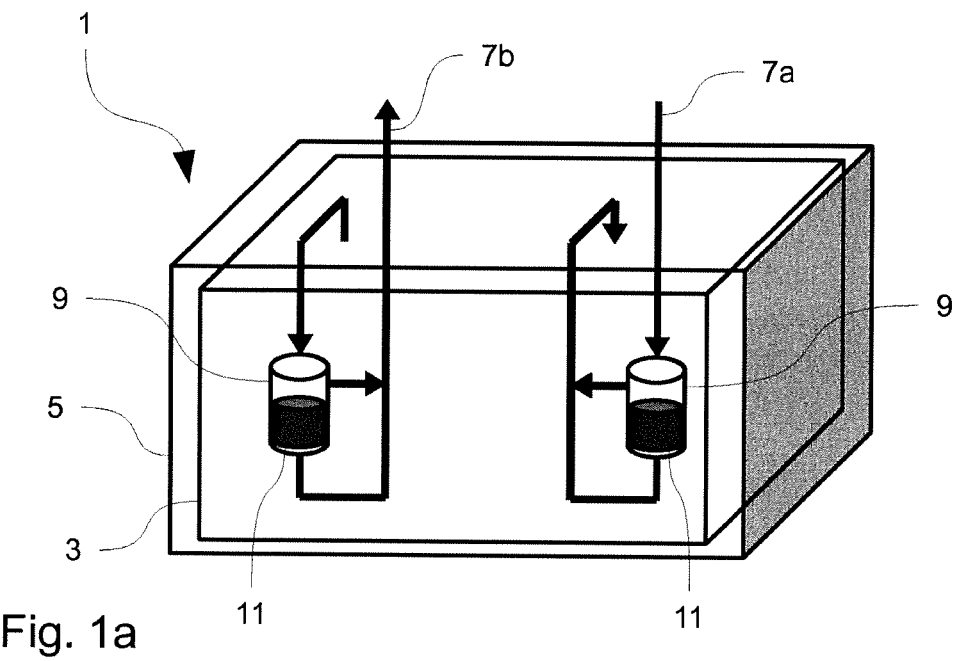

(51) Int. Cl.
*F16K 31/22* (2006.01)
*F28D 20/00* (2006.01)
*F16K 33/00* (2006.01)
*F28F 27/00* (2006.01)
*H01M 6/36* (2006.01)

(52) U.S. Cl.
CPC ............ *F28D 20/028* (2013.01); *F28F 27/00* (2013.01); *H01M 6/36* (2013.01); *F28D 2020/0073* (2013.01); *Y02E 60/142* (2013.01); *Y02E 60/145* (2013.01)

(56) References Cited

OTHER PUBLICATIONS

Written Opinion of the International Searching Authority issued in PCT/EP2016/052193 dated May 3, 2016 (4 pages).

\* cited by examiner

THERMAL BATTERY WITH SHUT-OFF VALVE

The present invention relates to the domain of thermal batteries, and more specifically the thermal batteries placed in a thermal management circuit of a motor vehicle.

Thermal batteries are normally used to heat the passenger compartment, notably in electric and hybrid vehicles, or to preheat a heat-transfer fluid in a thermal management circuit. Thermal batteries can also be used to preheat engine oil or the oil in an automatic transmission box of a vehicle with an internal-combustion engine.

These thermal batteries are usually loaded with heat energy when the motor vehicle is being driven, to be used at a later time. The challenge for these thermal batteries is therefore to keep the heat energy stored long enough so that the batteries have sufficient heat energy to operate when next used.

A known solution for preventing the dissipation of heat energy is to install thermal insulation about the whole of the thermal battery. Different types of insulant can be used, such as foam, aerogel or vacuum insulant (such as vacuum insulation panels, double walls, etc.). Although some of these solutions insulate the walls efficiently, the thermal losses by thermo-syphon and/or conduction via the fluid passing through the thermal battery are not prevented.

One of the objectives of the present invention is to at least partially overcome the drawbacks in the prior art and to propose a thermal battery with improved insulation.

The present invention thus relates to a thermal battery including a storage vessel as well as an inlet pipe and an outlet pipe for a fluid, that are connected to a circulation circuit for said fluid, said thermal battery also including at least two shut-off valves placed on the fluid inlet pipe and the fluid outlet pipe, respectively, in order to isolate the fluid contained in the storage vessel when the circulation circuit of said fluid is shut off, said shut-off valves being automatic and including:
an enclosure containing the fluid and including an inlet and an outlet for said fluid,
a float placed inside said enclosure that is moveable between:
an upper position in which the float floats and obstructs at least the fluid outlet when the circulation circuit for said fluid is shut off, and
a lower position in which the float is submerged and allows the fluid to flow between the inlet and the fluid outlet when the circulation circuit is operational.

The presence of these shut-off valves limits the heat exchanges between the fluid contained in the storage vessel and the fluid contained in the circulation circuit, which improves the thermal insulation of the thermal battery, thereby necessarily improving the time during which the thermal battery can contain and store the heat energy. Furthermore, the float makes the shut-off valves automatic, i.e. the floats prevent the fluid from flowing back when the circulation circuit is shut off without any external intervention.

According to one aspect of the invention, the shut-off valves include an anti-blocking device of the float that enables the fluid to flow between an upper portion of the enclosure located above the float and a lower portion of the enclosure located beneath the float when said float is moving.

According to another aspect of the invention, the anti-blocking device of the float is at least one slot formed in the inner wall of the enclosure that links the lower portion and the upper portion of the enclosure.

According to another aspect of the invention, the anti-blocking device of the float is at least one slot formed in the wall of the float that links the lower portion and the upper portion of the enclosure.

According to another aspect of the invention, the anti-blocking device of the float is at least one pipe passing through the float that links the lower portion and the upper portion of the enclosure.

According to another aspect of the invention, the anti-blocking device of the float is a secondary fluid circuit linking the fluid outlet of the enclosure to the lower portion.

According to another aspect of the invention, the anti-blocking device of the float includes a guide, in which the float can slide between the upper position of same and lower position of same, and a perforated base, the guide and the base being arranged at a given distance from the wall of the enclosure such that the fluid can flow between the wall of the enclosure and the guide, as well as beneath the base.

According to another aspect of the invention, the float is cylindrical and the inside of the enclosure is also cylindrical.

According to another aspect of the invention, the float is cylindrical with a conical upper portion, and the inside of the enclosure is also cylindrical with a conical upper portion.

According to another aspect of the invention, the float is spherical and the inside of the enclosure is cylindrical with a spherical upper portion.

According to another aspect of the invention, the shut-off valves are placed inside the storage vessel.

According to another aspect of the invention, the shut-off valves are placed between the storage vessel and a layer of thermal insulation.

Figure 1B:
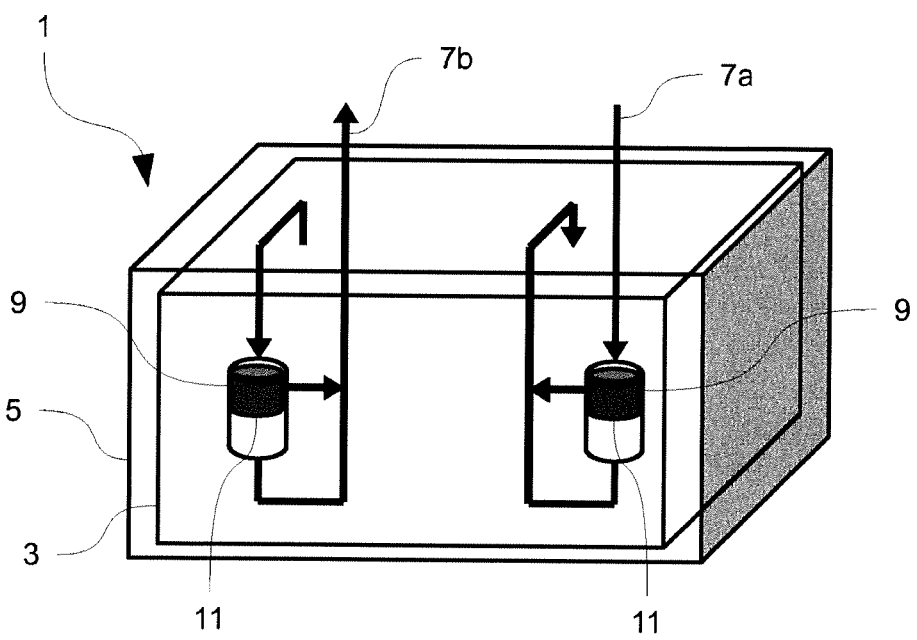
Figure 2A:
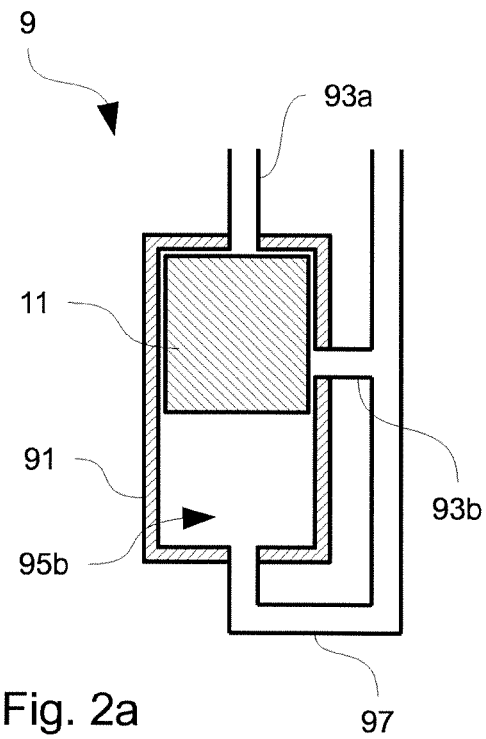
Figure 2B:
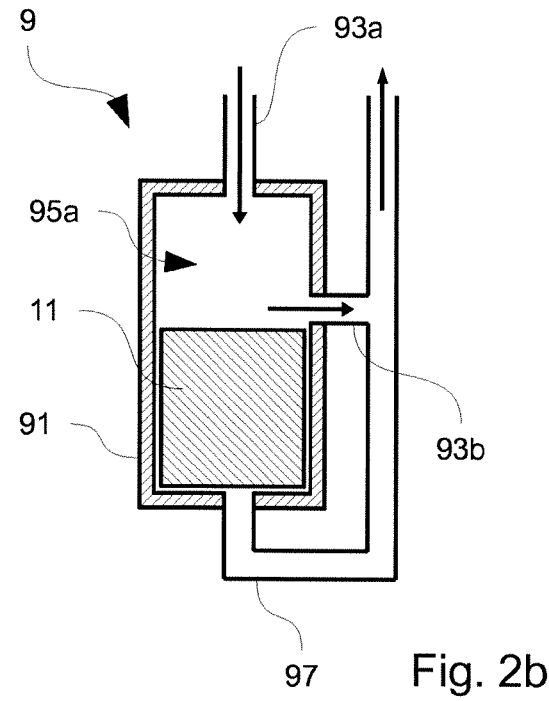
Figure 3A:
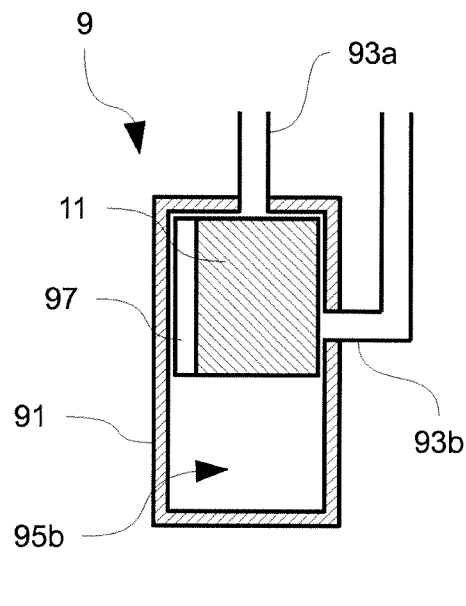
Figure 3B:
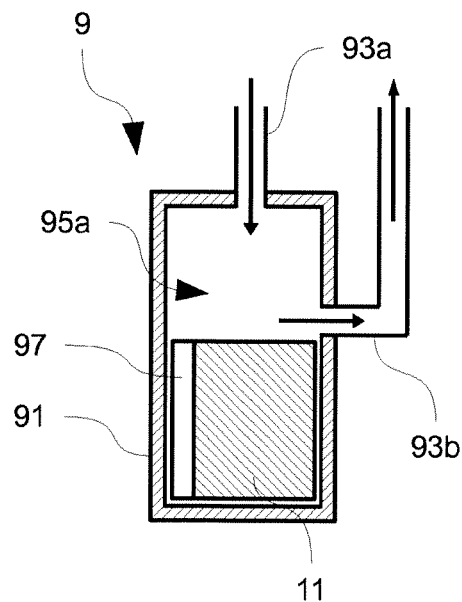
Figure 4A:
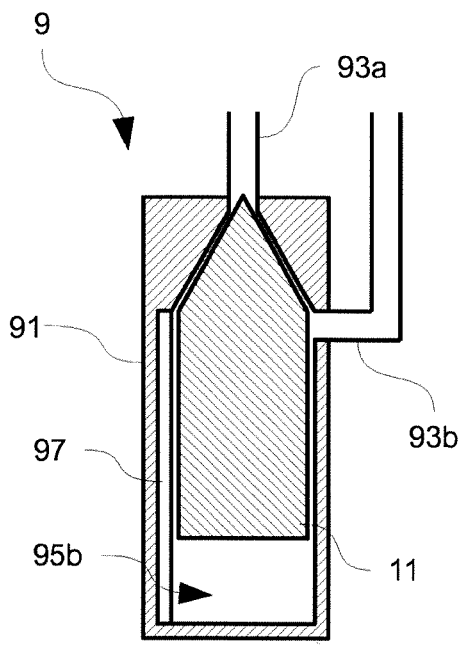
Figure 4B:
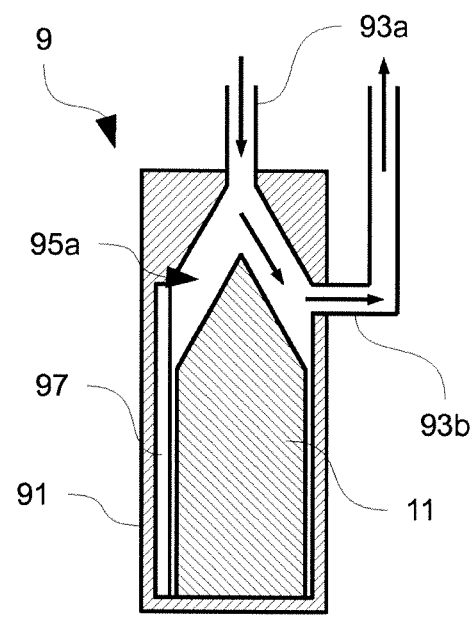
Figure 5A:
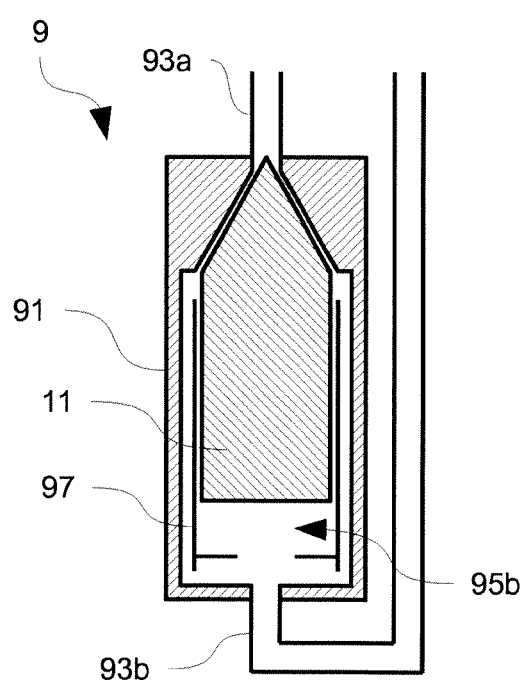
Figure 5B:
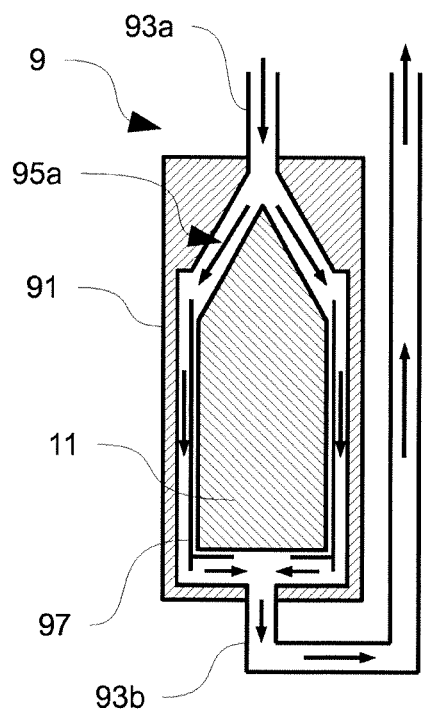
Figure 6A:
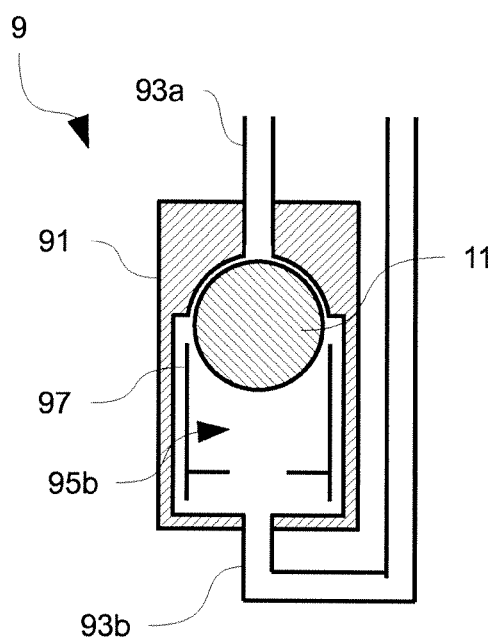
Figure 6B:
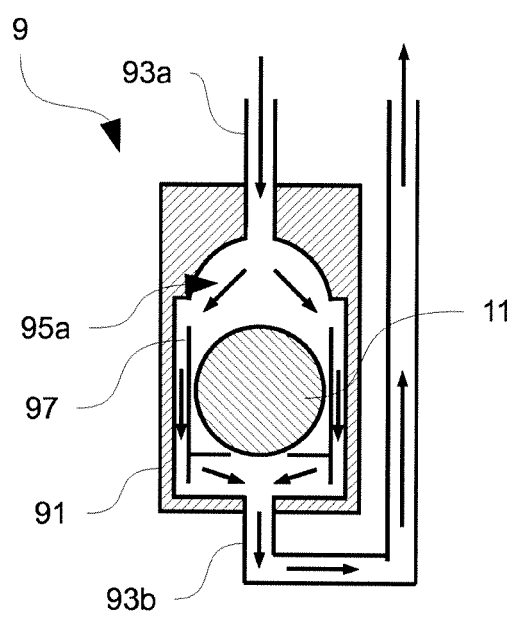

Other characteristics and advantages of the invention will become more clearly apparent on reading the description below, given by way of non-limiting example and the attached drawings, in which:

FIGS. 1a and 1b are schematic representations of a thermal battery,

FIGS. 2a and 2b are schematic representations of a shut-off valve according to a first embodiment, FIGS. 3a and 3b are schematic representations of a shut-off valve according to a second embodiment, FIGS. 4a and 4b are schematic representations of a shut-off valve according to a third embodiment, FIGS. 5a and 5b are schematic representations of a shut-off valve according to a fourth embodiment, FIGS. 6a and 6b are schematic representations of a shut-off valve according to a fifth embodiment.

Identical elements in different figures are identified using the same reference numbers.

As shown in FIGS. 1a and 1b, a thermal battery 1 usually has a storage vessel 3, as well as an inlet pipe 7a and an outlet pipe 7b for a fluid. These fluid inlet and outlet pipes 7a, 7b are connected to a circulation circuit for said fluid.

The storage vessel 3 may for example enable the fluid to be stored, or may contain a material designed to store heat energy, such as a phase-change material, in order to heat or cool said fluid when same is passing through the thermal battery.

In order to thermally insulate the storage vessel 3 from the outside, this latter can be surrounded by a layer of thermal insulation 5.

The thermal battery 1 also includes at least two shut-off valves 9. The shut-off valves 9 are respectively placed on the inlet pipe 7a and the fluid outlet pipe 7b in order to insulate the fluid contained in the storage vessel 3 when the circulation circuit for said fluid is shut off. The shut-off valve 9 placed on the inlet pipe 7a enables fluid to pass from the circulation circuit to the storage vessel 3 when the circulation circuit is operational, but when the circulation circuit is shut off, the shut-off valve 9 prevents the fluid from flowing back from the storage vessel 3 to the circulation circuit. Conversely, the shut-off valve 9 placed on the outlet pipe 7b enables fluid to pass from the storage vessel 3 to the circulation circuit when the circulation circuit is operational, but when the circulation circuit is shut off, the shut-off valve 9 prevents the fluid from flowing back from the circulation circuit to the storage vessel 3.

The fluid contained in the storage vessel 3 is then insulated from the fluid contained in the circulation circuit when this latter is not operational. The heat exchanges between the fluid contained in the storage vessel 3 and the fluid contained in the circulation circuit are therefore limited, which improves the thermal insulation of the thermal battery 1, thereby necessarily improving the time during which the thermal battery can contain and store the heat energy.

In order to minimize heat exchanges with the outside, the shut-off valves 9 are preferably arranged inside the storage vessel 3 itself, or between this latter and the layer of thermal insulation 5.

As shown in greater detail in FIGS. 2a to 6b, the shut-off valves 9 include an enclosure 91 containing the fluid and including an inlet 93a and an outlet 93b for said fluid. The inlet 93a and the fluid outlet 93b are linked either to the circulation circuit or to the storage vessel 3 as a function of the position of the shut-off valve 9. The shut-off valve 9 placed on the inlet pipe 7a therefore has the inlet 93a connected to the circulation circuit and the fluid outlet 93b connected to the storage vessel 3. Conversely, the shut-off valve 9 placed on the outlet pipe 7b has the inlet 93a connected to the storage vessel 3 and the fluid outlet 93b connected to the circulation circuit.

Inside the enclosure 91, the shut-off valves 9 include a float 11. This float 11 is moveable between:

- an upper position in which the float floats and obstructs at least the fluid outlet 93b when the circulation circuit for said fluid is shut off, as shown in FIGS. 2a, 3a, 4a, 5a and 6a, and
- a lower position, when the circulation circuit for the fluid is operational, in which the float is submerged by being pushed by the flow of the fluid and allows the fluid to flow between the inlet 93a and the fluid outlet 93b, as shown in FIGS. 2b, 3b, 4b, 5b and 6b.

The float 11 makes the shut-off valves 9 automatic, i.e. the floats prevent the fluid from flowing back when the circulation circuit is shut off without any external intervention.

The float 11 may take a range of different forms. FIGS. 2a to 3b show a first example float 11 that is cylindrical. The shape of the inside of the enclosure 91 is complementary, and therefore also cylindrical, to enable the float 11 to move between the two positions of same.

FIGS. 4a to 5b show a second example float 11, that is also cylindrical, but with a conical upper portion. In this example, the inside of the enclosure 91 is also complimentary, and therefore cylindrical with a conical upper portion 95a.

FIGS. 6a and 6b show a third example float 11 that is spherical. In this example, the inside of the enclosure 91 is also complimentary, and therefore cylindrical with a spherical upper portion 95a.

The shut-off valves 3 also include an anti-blocking device 97 of the float 11. This anti-blocking device 97 enables the fluid to flow between an upper portion 95a of the enclosure 91 located above the float 11 and a lower portion 95b of the enclosure 91 located beneath the float 11 when said float 11 is moving. Thus, the float 11 can move from the upper position thereof to the lower position thereof and vice versa without generating any suction effect or resistance to the movement of same.

According to a first embodiment shown in FIGS. 2a and 2b, the anti-blocking device 97 of the float 11 is a secondary fluid circuit linking the fluid outlet 93b of the enclosure 91 to the lower portion 95b.

According to a second embodiment shown in FIGS. 3a and 3b, the anti-blocking device 97 of the float 11 is at least one slot formed in the wall of the float 11 that links the lower portion 95b and the upper portion 95a of the enclosure 91.

One possible variant (not shown) of this embodiment is that the anti-blocking device 97 of the float 11 is at least one pipe passing through the float 11 that links the lower portion 95b and the upper portion 95a of the enclosure 91.

According to a third embodiment shown in FIGS. 4a and 4b, the anti-blocking device 97 of the float 11 is at least one slot formed in the inner wall of the enclosure 91 that links the lower portion 95b and the upper portion 95a of the enclosure 91.

According to a fourth embodiment shown in FIGS. 5a to 6b, the anti-blocking device 97 of the float 11 has a guide in which the float 11 can slide between the upper position of same and the lower position of same and a perforated base. The guide and the base are arranged at a given distance from the wall of the enclosure 91 such that the fluid can flow between the wall of the enclosure 91 and the guide, as well as beneath the base.

Thus it can be seen that the thermal battery 1 according to invention, on account of the presence of shut-off valves 9 and the formation thereof, enables improved thermal insulation of said thermal battery 1.

The invention claimed is:

1. A thermal battery comprising:
   a storage vessel that stores a fluid;
   an inlet pipe and an outlet pipe operably connected to the storage vessel, the inlet pipe and the outlet pipe cycling all the fluid into the storage vessel and out of the storage vessel, respectively; and
   at least two shut-off valves placed on the inlet pipe and the fluid outlet pipe, respectively,
   wherein the at least two shut-off valves automatically isolate the fluid contained in the storage vessel when circulation of said fluid is shut off,
   wherein each of said shut-off valves comprises:
      an enclosure that comprises an inlet and an outlet, and contains the fluid passing from the inlet to the outlet, and
      a float that moves between:
         an upper position in which the float floats and obstructs at least the fluid outlet when circulation for said fluid is shut off, and
         a lower position in which the float is submerged and allows the fluid to flow between the inlet and the fluid outlet when circulation for the fluid is operational.

2. The thermal battery as claimed in claim 1, wherein the shut-off valves further comprise an anti-blocking device that is coupled to the float and enables the fluid to flow between an upper portion of the enclosure located above the float and a lower portion of the enclosure located beneath the float when said float is moving.

3. The thermal battery as claimed in claim 2, wherein the anti-blocking device is at least one slot formed in the inner wall of the enclosure that links the lower portion and the upper portion of the enclosure.

4. The thermal battery as claimed in claim 2, wherein the anti-blocking device is at least one slot formed in the wall of the float that links the lower portion and the upper portion of the enclosure.

5. The thermal battery as claimed in claim 2, wherein the anti-blocking device is at least one pipe passing through the float that links the lower portion and the upper portion of the enclosure.

6. The thermal battery as claimed in claim 2, wherein the anti-blocking device links the fluid outlet of the enclosure to the lower portion.

7. The thermal battery as claimed in claim 2, wherein the anti-blocking device includes a guide, in which the float slides between the upper position of same and lower position of same, and a perforated base, the guide and the base being arranged at a given distance from the wall of the enclosure such that the fluid flows between the wall of the enclosure and the guide, and beneath the base.

8. The thermal battery as claimed in claim 1, wherein the float is cylindrical and the inside of the enclosure is also cylindrical.

9. The thermal battery as claimed in claim 1, wherein the float is cylindrical with a conical upper portion, and the inside of the enclosure is also cylindrical with a conical upper portion.

10. The thermal battery as claimed in claim 1, wherein the float is spherical, and the inside of the enclosure is cylindrical with a spherical upper portion.

11. The thermal battery as claimed in claim 1, wherein the shut-off valves are placed inside the storage vessel.

12. The thermal battery as claimed in claim 1, wherein the shut-off valves are placed between the storage vessel and a layer of thermal insulation.

13. An assembly for a thermal battery, the assembly comprising:
  a storage vessel that stores a fluid;
  an enclosure comprising;
  an inlet pipe and an outlet pipe operably connected to the storage vessel, the inlet pipe and the outlet pipe cycling all the fluid into the storage vessel and out of the storage vessel, respectively,
  a float that moves between:
    an upper position in which the float floats and obstructs at least the fluid outlet when circulation for said fluid is shut off, and
    a lower position in which the float is submerged and allows the fluid to flow between the inlet and the fluid outlet when circulation for the fluid is operational; and
  at least two shut-off valves placed on the inlet pipe and the fluid outlet pipe, respectively, in order to isolate the fluid contained in the storage vessel when circulation circuit of said fluid is shut off,
  wherein said shut-off valves automatically isolate the fluid contained in the storage vessel when the circulation of said fluid is shut off.

\* \* \* \* \*